Sept. 20, 1955 R. S. YODER ET AL 2,718,623

TUNER

Filed Aug. 30, 1951 5 Sheets-Sheet 1

INVENTORS.
Raymond S. Yoder
Harvey F. Smith
BY
Foorman L. Mueller
Atty.

Sept. 20, 1955 R. S. YODER ET AL 2,718,623

TUNER

Filed Aug. 30, 1951 5 Sheets-Sheet 2

INVENTORS.
Raymond S. Yoder
Harvey F. Smith
BY Norman L. Mueller
Att'y.

INVENTORS.
Raymond S. Yoder
Harvey F. Smith
BY
Foorman L. Mueller
Atty.

Sept. 20, 1955 R. S. YODER ET AL 2,718,623

TUNER

Filed Aug. 30, 1951 5 Sheets-Sheet 4

INVENTORS.
Raymond S. Yoder
Harvey F. Smith
BY
Foorman L. Mueller
Atty.

Sept. 20, 1955 R. S. YODER ET AL 2,718,623

TUNER

Filed Aug. 30, 1951 5 Sheets-Sheet 5

INVENTORS.
Raymond S. Yoder
Harvey F. Smith
BY Foorman L. Mueller
Att'y.

United States Patent Office 2,718,623

Patented Sept. 20, 1955

2,718,623

TUNER

Raymond S. Yoder, Oak Park, and Harvey F. Smith, Chicago, Ill., assignors to Motorola, Inc., Chicago, Ill., a corporation of Illinois Application August 30, 1951, Serial No. 244,436

5 Claims. (Cl. 336—192)

This invention relates generally to electronic wave tuners, and more particularly to tuners of the printed circuit type including a plurality of discs, with tuning components for various channels being provided on different sectors of the discs.

For providing operation of electronic equipment on a plurality of channels which cover different frequencies, various components may be selectively switched into a circuit to provide operation on the desired channels. In such tuners, the components are relatively critical in order that the tuner will accurately select the desired frequencies. In many instances it is desired to select frequencies of widely differing values which requires that the components must have quite different characteristics. One example of this is the presently assigned very high frequency television band which includes twelve channels varying in frequency from 54 megacycles to 216 megacycles. At the high frequencies, very small inductance values provide the required tuning so that the construction thereof is quite critical, whereas at the low frequencies substantially greater inductances are required for tuning.

In order to provide components having accurate values with relatively low cost, it has been proposed to use printed circuits to provide various components of such tuners. Although circuits can be reproduced photographically with very great accuracy, some plating or other depositing operation is required to provide sufficient conductor thickness. These operations, however, are difficult to control accurately. That is, both the width and thickness of the conductors may vary somewhat causing substantial variations in the values of the components formed thereby.

It is also required that some simple means of switching be provided so that at least certain portions of the circuit can be changed to provide tuning to the different channels. Referring again to very high frequency television broadcasting, the channels assigned are in two different frequency bands so that it may be necessary in some circuits to provide different components in the two bands, as well as different components for the individual channels. This tends to complicate the switching problem since it is not desired to change any more components than necessary to reduce the cost, size, and general complexity of the tuner structure.

It is, therefore, an object of the present invention to provide an improved printed circuit tuner.

Another object is to provide a printed circuit tuner in which the operation will not be affected objectionably by slight tolerances in manufacture.

A further object of this invention is to provide a tuner including components of the printed circuit type in which various adjustments of the values of the circuit components can be provided to compensate for tolerances in the manufacture thereof.

A still further object of the present invention is to provide a printed circuit tuner in which the components are arranged so that minimum duplication of components is required for the various channels, and the switching of individual components is provided simply.

A feature of this invention is the provision of a tuner including discs made of insulating material with printed circuits on both sides thereof, with the circuits in corresponding sectors of the discs providing tuning in one of a plurality of different channels.

Another feature of this invention is the provision of a printed circuit tuner including a printed chassis having contacts thereon selectively engaging contacts on printed circuit discs on which the individual components are provided, with more than two connections being made to each disc so that the components thereon may be connected in different circuit positions for different channels.

A further feature of this invention is the provision of a printed circuit tuner including insulating sheets having printed circuits on both sides thereof, with notches and/or openings being provided in the sheets so that the deposited conductor material extends through to both sides to interconnect the circuits on the two sides. The interconnection of the conductors on the two sides also serves to mechanically hold the deposited conductors on the insulating sheets.

Still another feature of this invention is the provision of tuning inductors formed by conductors in printed form, with alternative conductor portions being provided so that the length of the conductor can easily be changed to thereby vary the value of the inductor. Alternative paths may also be provided with one path of reduced cross-section serving as a fuse and being bridged by a path which is normally open, so that, in the event the reduced path is burned out, the circuit can be completed by bridging across the normally open alternate path.

Further objects and features, and the attending advantages of the invention will be apparent from the consideration of the following description when taken in connection with the accompanying drawings in which.

Figure 4:
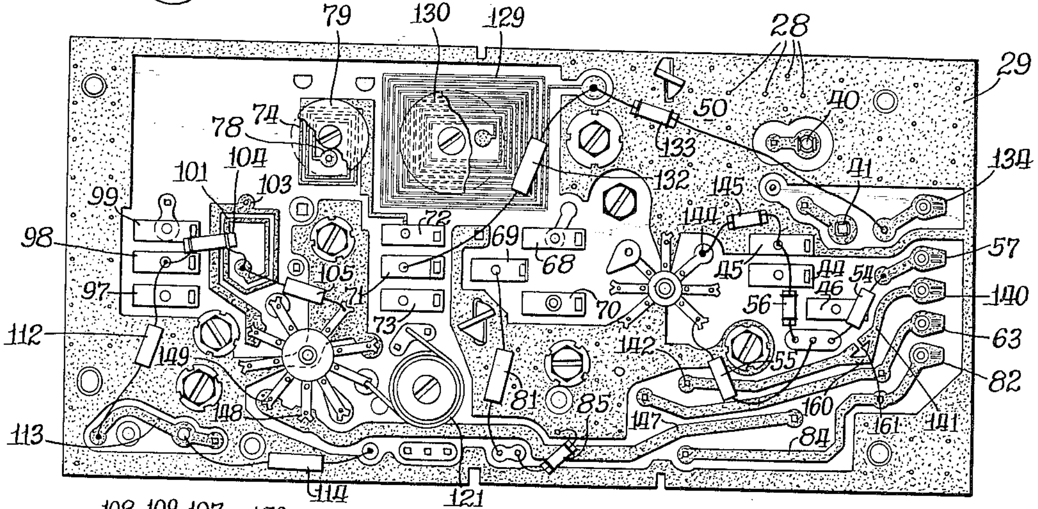
Figure 5:
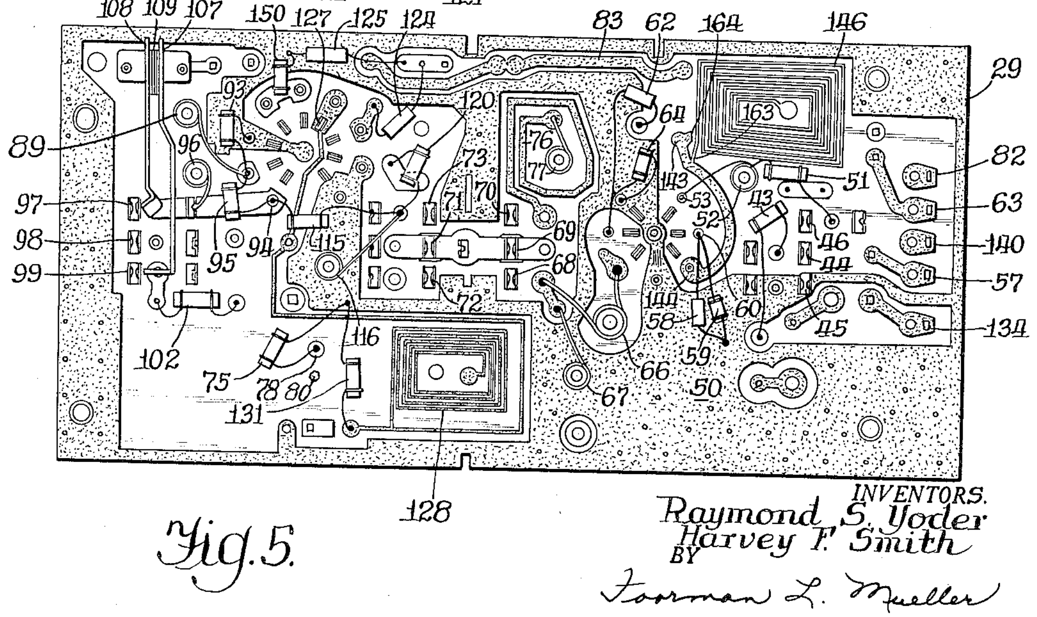
Figure 2:
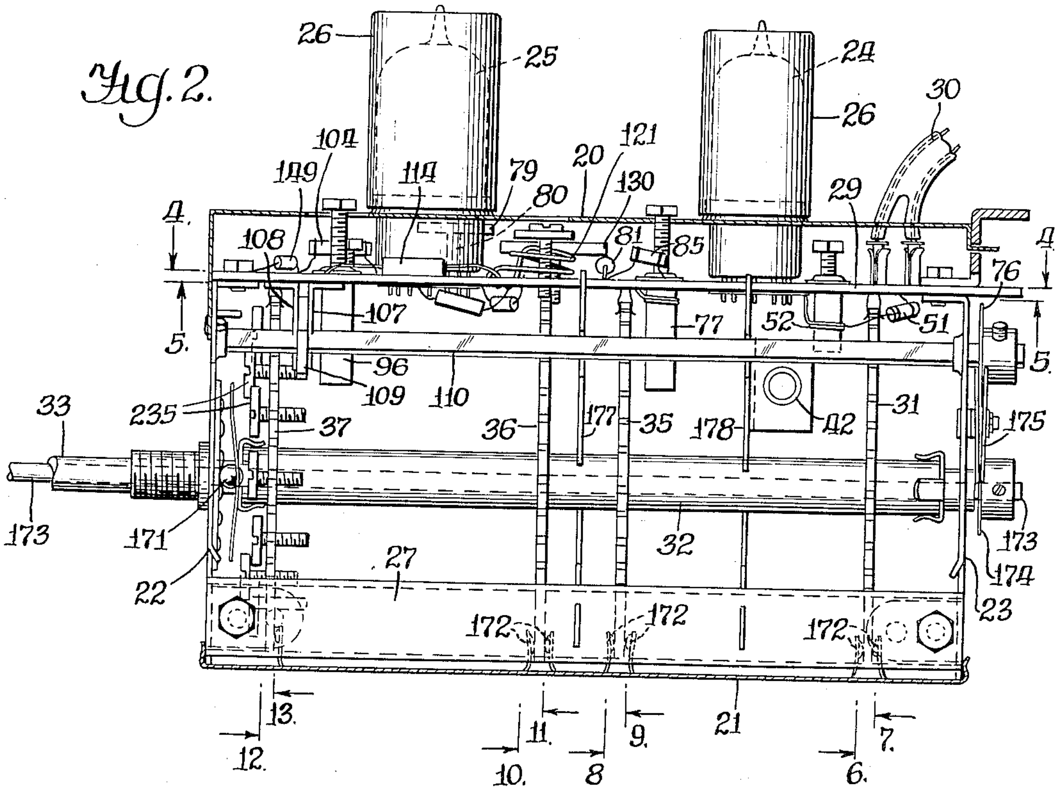
Fig. 2 is a cross-section view to the tuner of Fig. 1.
Figure 15:
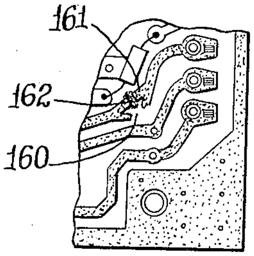
Figure 8:
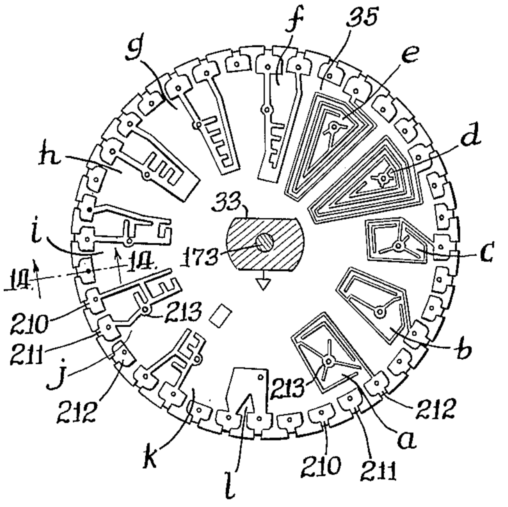
Figure 14:
Figures 16, 16A:
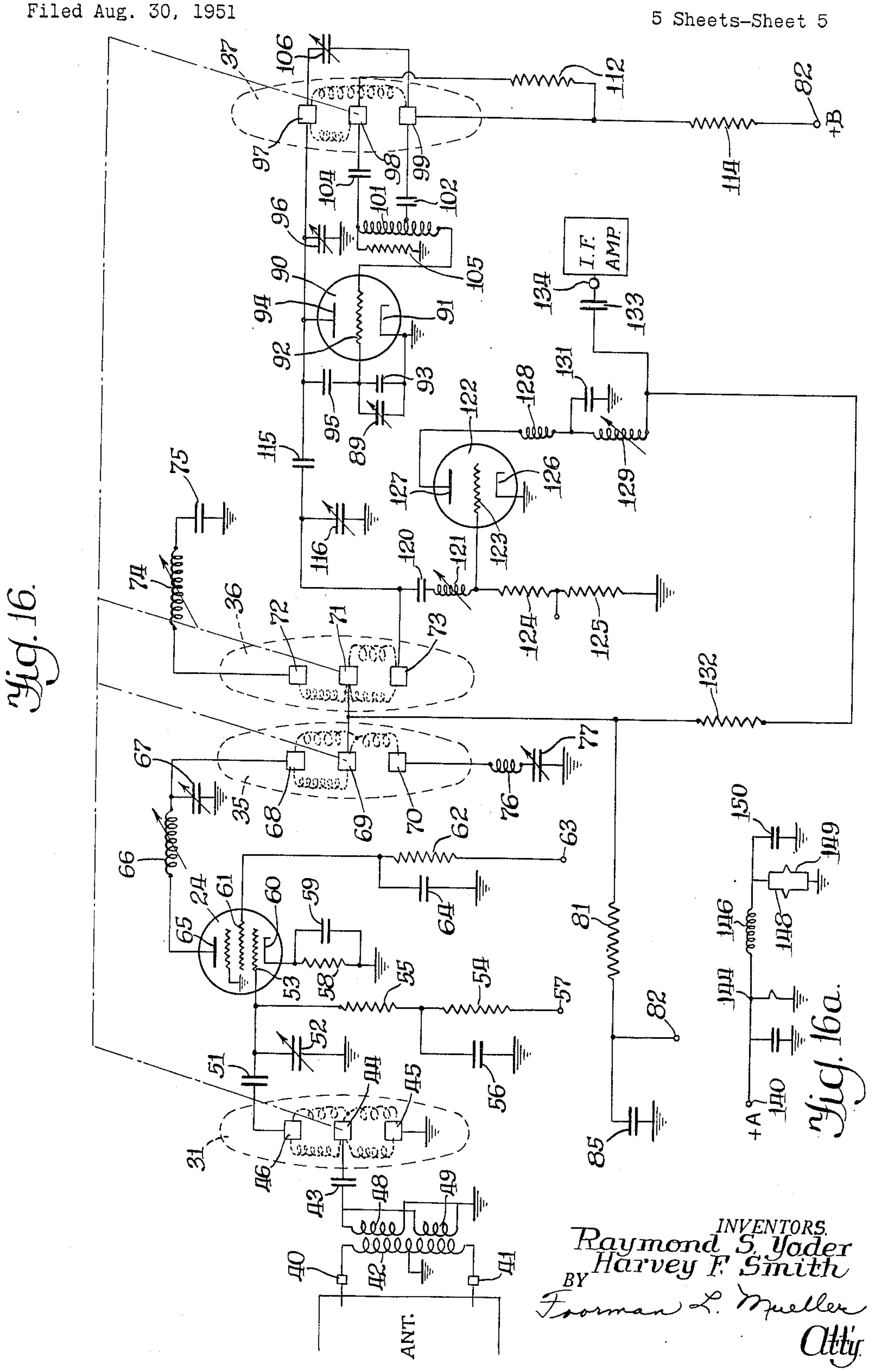

Figs. 4 and 5 are cross-sectional views of the top and bottom sides of the main chassis respectively, taken along the lines 4—4 and 5—5 of Fig. 2;

Figs. 6 to 13 inclusive show the sides of the various printed circuit discs of the tuner along the corresponding view lines of Fig. 2;

Fig. 14 is a cross-sectional view along the lines 14—14 of Fig. 8;

Fig. 15 is an enlarged detail view illustrating the printed circuit fuse;

Fig. 16 is a circuit diagram illustrating the operative connections of the various electrical components of the tuner; and Fig. 16A is a circuit diagram showing the heater circuit for the tubes of the tuner.

In practicing the invention there is provided a tuner for use in selecting the 12 very high frequency television channels. The tuner includes a chassis of the printed circuit type with certain components provided on either side thereof. The chassis has contacts projecting therefrom and means for movably supporting a plurality of tuning members having printed contacts along the edges thereof adapted to be moved into selective engagement with the contacts projecting from the chassis. The discs also include printed circuits on either or both sides thereof forming inductors. The circuits on the discs are located in sections corresponding to the different channels. Three contacts are provided between the chassis and each tuning member, so that the circuit components may be connected to the chassis in different manners for different channels. This permits reducing to a minimum the number of individual tuning components which must be provided for each channel, and at the same time provides relatively simple switching to connect the desired individual components.

On the printed circuit chassis as well as the printed circuit tuning members, components are provided on both sides of an insulating base member and are connected by conducting material deposited in openings or notches in the insulating base member. Continuous conducting material is thereby provided connecting the layers on the two sides of the insulating member, which also acts mechanically to hold the conducting material on the insulating member. This is particularly important in the contacts deposited on the movable tuning members which frictionally engage the contacts extending from the chassis. Alternate printed paths are provided in many instances which can be selectively connected to change inductance values, and to complete a circuit in the event one path becomes open. This permits the use of relatively thin printed conductors as fuses, with the open circuit resulting from burning out of the fuse being bridged through the alternate path.

Figure 1:
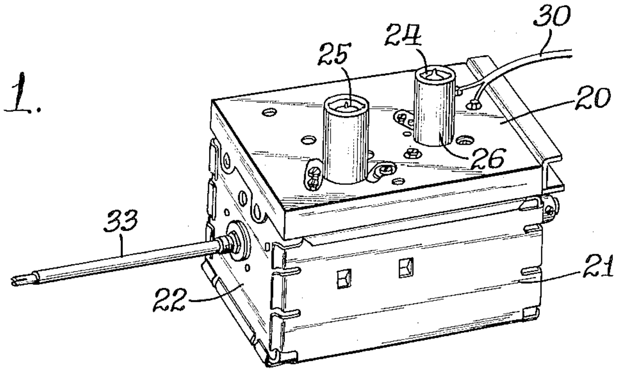
Fig. 1 is a perspective view of a tuner constructed in accordance with the invention.
Figure 3:
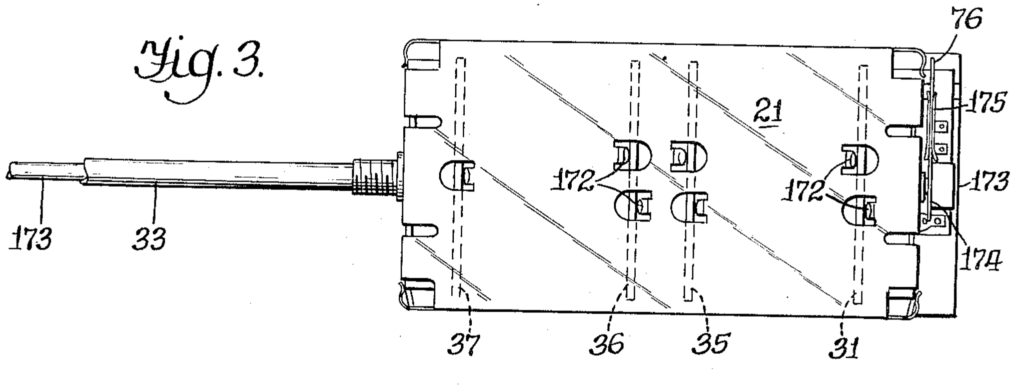
Fig. 3 is a bottom view of the tuner.

Referring now to the drawings, Figs. 1, 2, and 3 illustrate the general physical arrangement of the tuner unit. The complete unit is surrounded by a top shield 20 and a bottom shield 21, which together with end plates 22 and 23 substantially enclose the unit. The main chassis of the tuner 29 is formed by an insulating sheet having conducting material deposited on both sides thereof forming circuits thereon. Openings 28 are provided in large areas of the conducting material to let moisture escape from the insulating sheet without causing blistering of the conducting material. The end plates are connected by braces 27 and the main chassis 29 to provide a frame for the tuner. Extending from the main chassis 29 through the top shield 20 are vacuum tubes 24 and 25 which have shields 26 thereabout supported on and electrically connected to the top shield 20. Signals from the antenna are applied through balanced transmission line 30, and are selected by an antenna circuit provided on the chassis 29 and selectively including elements for selecting different channels provided on the tuning member or disc 31. This disc and other discs to be described are provided on shaft 32 supported by end plates 22 and 23. The shaft 32 has a tubular operating portion 33, extending through the end plate 22.

The signals selected by the antenna circuit are applied to a radio frequency amplifier stage provided by the chassis 29 and including the tube 24. The radio frequency amplifier stage includes a double tuned output circuit with certain components thereof being provided on the chassis 29 and other components being provided on the discs 35 and 36. An oscillator circuit is included in the tuner, with certain components thereof being provided on the chassis 29, and other components being provided on the disc 37. A triode section of the tube 25 forms the oscillating valve of the oscillator circuit. The output from the oscillator circuit and the amplified received wave from the radio frequency amplifier are applied to a mixer stage including certain components provided on the chassis 29 and a triode section included in the tube 25 with the triode oscillator section.

Considering the tuner more in detail, reference is made to Figs. 2, 4, 5 and 16. Similar reference numbers are used on Figs. 2, 4 and 5 which show the physical elements, and on Fig. 16 which shows the elements schematically. The signals from the antenna are applied from terminals 40 and 41 to a coil 42 (Figs. 2 and 16) having a grounded center tap. Windings 48 and 49 are inductively coupled to coil 42 and connected in parallel, with the signal developed therein being applied through capacitor 43 to the fixed contact 44 which is the center contact of the first group of three fixed contacts on the chassis. As will be explained more fully, the fixed contacts 44, 45 and 46 are selectively connected to various contacts on the disc 31 so that various inductances are provided therebetween, with a coupling inductance being connected between contacts 44 and 45 and a series tuning inductance between terminals 44 and 46. The circuit connections provided between the contacts for operation on the low frequency band are shown by dotted lines, and the connections for operation on the high frequency band by dot-dash lines. It will be noted from Figs. 4 and 5 that the terminal 45 is connected to the ground coating 50 which covers a large part of both the top and bottom surfaces to the main chassis 29.

The fixed contact 46 is connected in series with capacitor 51 and across adjustable capacitor 52 to the grid 53 of the tube 24 to apply the signals from the antenna circuit thereto. An automatic gain control voltage may be applied to the grid 53 through resistors 54 and 55, with capacitor 56 providing the desired radio frequency bypass to ground for the grid. As shown in Fig. 4 the automatic gain control bias is applied to the chassis at terminal 57. Resistor 58 bypassed by capacitor 59 provides bias for the cathode 60 of the tube 24. B plus potential is applied to the screen 61 of the tube through resistor 62 connected to terminal 63 on the chassis, with the screen being bypassed by capacitor 64. The plate 65 of tube 24 is connected through variable inductor 66 and across trimmer capacitor 67 to the fixed contact 68 of the second bank of fixed contacts which also includes contacts 69 and 70.

Contact 69 of the second bank is directly connected to contact 71 of the third bank of fixed contacts which also includes contacts 72 and 73. As previously stated, a double tuned circuit is used in the plate of the radio frequency amplifier, and the various tuning inductances are selectively coupled thereto through the contacts 68, 69, 70, 71, 72 and 73. The discs 35 and 36 provide the tuning inductances and are arranged so that series inductors are connected between the terminals 68 and 69, and between terminals 71 and 73. (Low band shown dotted in Fig. 16, high band dot-dash). The coupling inductors for the low band are connected between contacts 71 and 72, and for the high band between contacts 69 and 70. This permits the coupling circuit including variable inductor 74 and capacitor 75 to be connected in the circuit on the low band, and the coupling circuit including inductor 76 and variable capacitor 77 to be connected in the circuit on the high band.

The connection between the inductor 74 and capacitor 75 is made through an opening in the insulating sheet of the chassis 29 in which the conducting material is deposited as indicated at 78 in Figs. 4 and 5. The effective inductance of the coil 74 may be varied by a conducting screw 79 (Figs. 2 and 4) having a threaded shank 80 extending therefrom which is threaded in an opening in the chassis 29 for adjusting the position of the head of the screw 79 with respect to the chassis, the effective value of the inductance of the coil 74, which is provided on the chassis 29 as deposited conducting material, may be varied. Plus B potential is applied to the plate 65 of tube 24 through the inductor connected between contacts 68 and 69, which latter is connected through resistor 81 to terminal 82. This circuit is provided through conducting strip 83 on the bottom side of the chassis 25 (Fig. 5), and through the strip 84 on the top side of the chassis (Fig. 4). A capacitor 85 is provided for bypassing radio frequencies.

As previously stated, the oscillator circuit includes a triode section of the tube 25. This triode section is indicated in Fig. 16 at 90 and includes grounded cathode 91, a grid 92 connected by capacitors 89 and 93 in parallel to ground, and a plate 94 coupled to the grid 92 by capacitor 95. The plate 94 is coupled to ground through adjustable capacitor 96 and is coupled to the fixed contact 97 of the last bank, which also includes fixed contacts 98 and 99. The grid 92 is also connected through coil 101 which is printed on the top side of the chassis to the contacts 98 and 99, being connected to contact 99 through a capacitor 102 which is connected to a tap 103 on the inductor 101, and through capacitor 104 to contact 98. As will appear more clearly, the use of the separate capacitors 102 and 104 permits separate and accurate temperature compensation on the two frequency bands. A resistor 105 is connected from the top end of the coil to ground.

The conductors provided on the disc 37 are arranged to selectively connect contacts 97 and 98 for tuning the oscillator on the low band (dotted in Fig. 16), and to connect contacts 97 and 99 for tuning the oscillator on the high band (dot-dash in Fig. 16). A trimmer capacitor 106 is provided between contacts 97 and 99 for fine tuning. This capacitor includes plates 107 and 108 connected to the contacts 97 and 99 respectively, with a dielectric member 109 (Fig. 5) positioned therebetween and mounted on a shaft 110 (Fig. 2) which is movable to vary the amount of dielectric material between the plates 107 and 108, to thereby vary the capacity. B plus potential is applied to contacts 98 and 99 to be applied through the tuning inductors to the plate 94 of tube 90. Potential is applied to contact 99 through resistor 114 which is connected to conducting strip 83 previously described. Connection is made to contact 98 through resistor 112, which is connected to conducting strip 113 connected to the capacitor plate 107, which is in turn connected to contact 99. The output from the oscillator is applied through capacitor 115 and across adjustable capacitor 116 to the contact 73 of the third bank of contacts.

The received signals as amplified in the radio frequency amplifier, and the output from the oscillator are combined at the contact 73 and applied through capacitor 120 and variable inductor 121 to the mixer tube section 122, which is also included in the tube 25. Resistors 124 and 125 complete the circuit from grid to ground and allow a bias to be developed from the oscillator output. A tap may be provided between these resistors for examining the waveforms applied to the grid. The cathode 126 of the mixer triode is grounded and the plate 127 is connected to an inductor 128 provided as a printed circuit on the bottom of the chassis in series with inductor 129 provided as a printed circuit on the top of the chassis. The value of inductor 129 is effectively varied by conducting screw 130 having a shank threaded in the chassis for adjustably positioning the head thereof with respect to the printed circuit. Capacitor 131 and inductor 128 are provided to improve performance on the higher frequency channels. Plate potential is provided for the triode 122 through resistor 132 which is connected to inductor 129. The output from the mixer is applied through capacitor 133 to the terminal 134 to be connected to the intermediate frequency amplifier of the receiver.

A printed circuit is also provided for supplying filament potential to the tubes. This potential is received at the terminal 140 on the chassis through strip 141 on the top side of the chassis to point 142, with the circuit continuing through an opening to the bottom side and connecting with strip 143. This strip goes directly to the pin 144 of tube 24. Capacitor 145 provides the required filtering. The filament potential then continues through coil 146 on the underside of the chassis to strip 147 on the top side where it continues to the filament connections 148 and 149 on the two triode sections in the tube 25. Capacitor 150 provides filtering for this point.

As previously stated, the discs 31, 35, 36 and 37 are provided on a shaft 32 pivoted between the end plates 22 and 23. A detent arrangement 171 is provided so that the shaft will tend to lock in the positions in which the sectors are properly connected to the chassis. The contacts supported on the chassis which engage the discs, tend to hold the discs in position on the top side, and guide portions 172 punched out of the shield 21 tend to hold the discs in position on the bottom side. To provide fine tuning, a second tuning shaft 173 is provided within the shaft 33 which controls the position of the discs. The shaft 173 operates through a friction linkage including wheels 174, 175 and 176 to drive shaft 110 previously described to thereby vary the capacity of the condenser 106. Conducting shields 177 and 178 are supported on the chassis 29 and braces 27 between the various discs, to provide shielding between the various circuits of the tuner.

Considering now the tuning members or discs that are used to provide the individual tuning elements used in the various circuits, it will be noted that each of these discs has a plurality of sections or sectors, and each sector has a plurality of contacts for connecting the same in the circuit. As the invention is illustrated in a television tuner for tuning twelve channels, twelve sectors are provided on each disc, each having an extent of 30 degrees. It is obvious that a different number of sectors may be provided. It is also preferable to have more than two contacts for each sector since this permits selective connections to the circuit on the chassis for various channels. In the circuit shown, three contacts are provided for each sector so that the overall arrangement is simple and yet is quite flexible.

As previously stated, conductors are provided on both sides of the discs and this results in a much greater flexibility in the arrangement of the tuning components. Connection is made through the disc by providing openings therein so that the deposited material extends all the way through. This arrangement has the additional advantage that the conductor which unites the coatings on the two sides also serves to mechanically hold the coatings on the disc. This is particularly important as to the contacts, since the friction between the contacts on the discs and the fixed contacts on the chassis tends to loosen the contacts from the insulating discs. To provide additional connection, notches may be provided at the edges of the discs through which the coatings extend, and with the openings provided inwardly of the edges, ties may be provided between the two coatings at two points. The provision of contacts formed by printing or depositing the conducting material on the discs greatly simplifies the construction of the discs and keep the cost thereof low.

Figure 6:
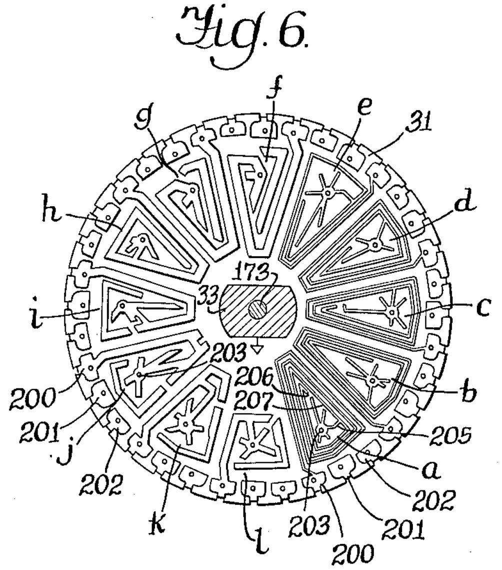
Figure 7:
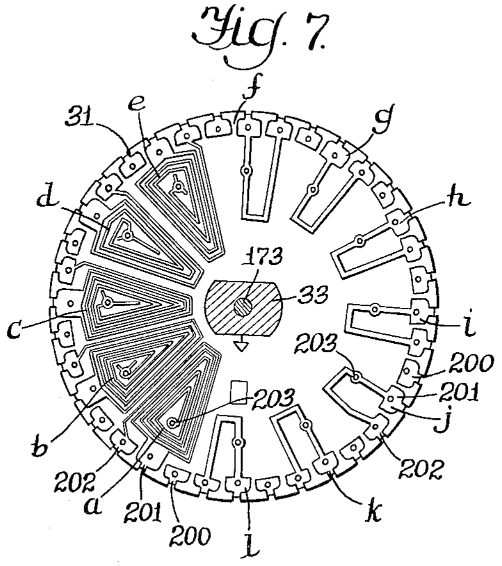

Considering the discs more in detail, in Figs. 6 and 7 there is illustrated the disc 31 used to tune the antenna circuit. The contacts on the two sides of the disc are given the same numbers to simplify the description. The various sectors on the disc are lettered *a, b, c, d, e, f, g, h, i, j, k,* and *l,* with *a* indicating the tuning elements for the lowest frequency and *l* indicating the tuning elements for the highest frequency.

The contacts on the sector *a* are indicated 200, 201, 202. When this sector is in position so that the contacts are engaged by the fixed contacts 44, 45 and 46, the contact 200 on the disc engages contact 46 on the chassis, contact 201 of the disc engages contact 44 on the chassis, and contact 202 on the disc engages contact 45 on the chassis. It will be noted from Fig. 6 that the circuit extending from contact 200 includes the entire circuit printed on that side of the disc and continues through opening 203 to the other side of the disc to the contact 201. The circuit continues then for substantially one turn from the contact 201 to the contact 202. Considering this as applied to Fig. 16, it is obvious that the large inductance between contacts 200 and 201 is the series inductance connected in series with capacitor 51 to the grid 53 of tube 24, and the small inductance between the contacts 201 and 202 is the coupling inductance provided to ground.

Similarly, in the other sectors the disc 31 provides a relatively large series inductance and a relatively small coupling inductance. Considering the high band sector indicated *j* for example, the circuit continues from contact 200 through the conductor printed on the side shown in Fig. 6 and through the opening 203 to the contact 201 to provide the series inductance. The coupling inductance is provided by a relatively short loop between contacts 201 and 202. The same type of circuit is provided for all of the other channels.

To permit certain changes of inductance in the coils provided on the discs, alternate circuit paths may be provided which have a break therein so that they are normally open. Considering the sector *a* shown in Fig. 6, for example, the circuit is completed from contact 200 to the opening 203 through the connection 205. However, if more inductance is desired, the connection 205 may be broken and connection made at the point 206 which will increase the length of the coil, and thereby increase the inductance. Alternatively, the inductance can be reduced by breaking the connection at 205 and making a connection at the point 207. Other partially completed paths are provided for providing other adjustments in the length of the conductor and thereby in the inductance provided by the coil formed by the conductor. In some of the sectors, such as the sector designated *d*, provision is made for adjustment of the length of the tuning inductor on both sides of the disc so that relatively wide variations is provided, and substantial adjustment can be made.

Figure 9:
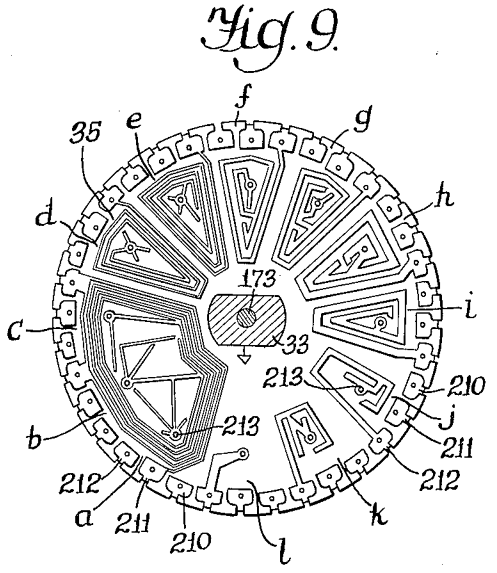

In Figs. 8 and 9 there is illustrated the disc 35 which forms the primary side of the double tuned circuit in the radio frequency amplifier, and which also provides the coupling circuit for operation on the high band. The sectors of the disc 35 which relate to the individual channels are designated by the same letters as on the disc 31 of the antenna circuit. It will be noted that alternate paths are provided in the same manner as in the antenna circuit and therefore this feature of the disc will not be described in detail. Another feature of the disc used in the double tuned circuit is the provision of a single coil for use on the three lowest channels with taps being provided on the coil so that the required inductance is provided for each channel.

The sector *a* of disc 35 includes contacts 210, 211 and 212 but it is noted that connection is made only between contact 211 and 212. That is, on the low band channels, one of which is tuned by sector *a*, the contact 210 is not used. The circuit extends from contact 212 (Fig. 8) through the opening 213 to the other side of the disc (Fig. 9), and from the opening 213 to the contact 211. When the disc is in position to tune the channel associated with sector *a*, contact 212 of the disc will engage fixed contact 68 of the chassis, and contact 211 of the disc will engage fixed contact 69 of the chassis. Contact 210 on the disc will engage contact 70 of the chassis but since there is no connection to contact 210, this circuit will not be completed. A similar arrangement is provided in the low band channels covered by sectors *a, b, c, d,* and *e*.

In the high band, the disc 35 also provides a connection between fixed contacts 69 and 70 on the chassis to complete the coupling circuit which includes the inductor 76 and the condenser 77 on the chassis, and an inductor portion on the disc 35. Considering sector *j* for example, the conductor extending from contact 212 (Fig. 9) continues to the opening 213 and through to contact 211 on the other side. This forms the primary inductance which will be connected between fixed contacts 68 and 69 on the chassis. The inductor portion between contacts 210 and 211 on the side shown in Fig. 8 will provide an inductive connection between contacts 69 and 70 on the chassis. This will complete the coupling circuit including inductor 76 and condenser 77 to provide the required coupling between the primary and secondary tuned circuits of the double tuned plate circuit for the radio frequency amplifier.

Figure 10:
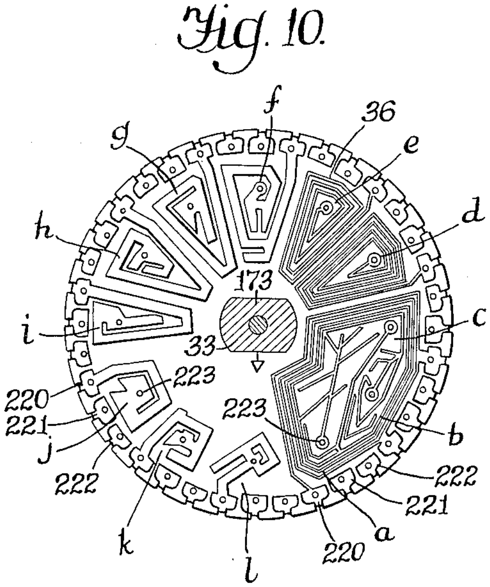
Figure 11:
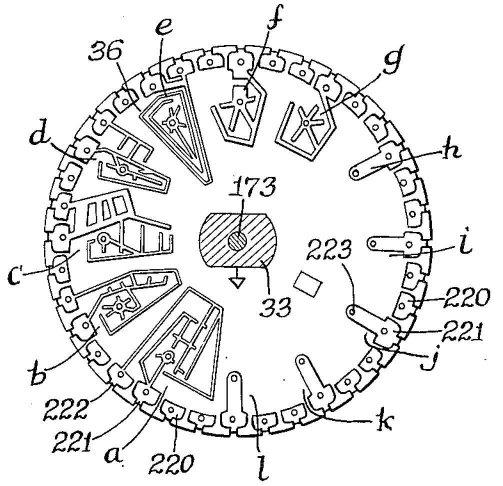

The disc 36 which provides the secondary portions of the double tuned circuit is illustrated in Figs. 10 and 11. The circuits on this disc may be generally similar to those on the disc 35 except that the disc 36 provides the coupling connections on the low band instead of on the high band. Considering the sector *a*, contacts 220, 221, and 222 provide the connections to fixed contacts 73, 71 and 72 respectively, on the chassis. Therefore, between contacts 71 and 73 will be the relatively large inductance provided by the printed coil starting at contact 220 and continuing to the opening 223 through to the other side and then to contact 221. The coupling inductance provided between contacts 71 and 72 will be the printed conductor provided between contacts 221 and 222 on the side of the disc shown in Fig. 11. This will complete the coupling circuit through inductor 74 and condenser 75 provided on the main chassis.

When operating on the high band channels, as for example, the channel provided by sector *j*, a circuit is provided on the disc 36 only between contacts 220 and 221. This circuit extends from contact 220 on the side shown in Fig. 10 to the opening 223 and on the other side to contact 221. This circuit will make a connection between fixed contacts 71 and 73 on the chassis, for providing the secondary tuning inductance on the high band channels. There will be no connection between contacts 71 and 72 so that the low band coupling circuit will be open.

Figure 12:
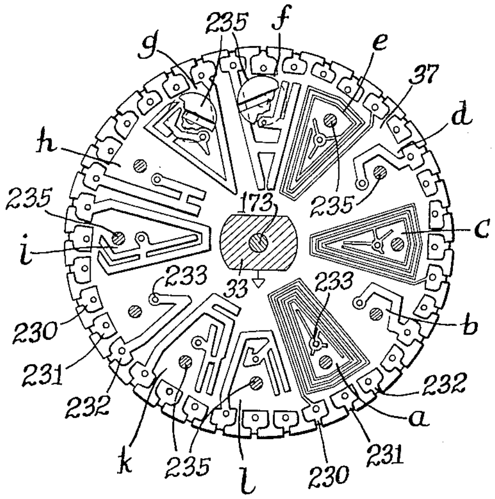
Figure 13:
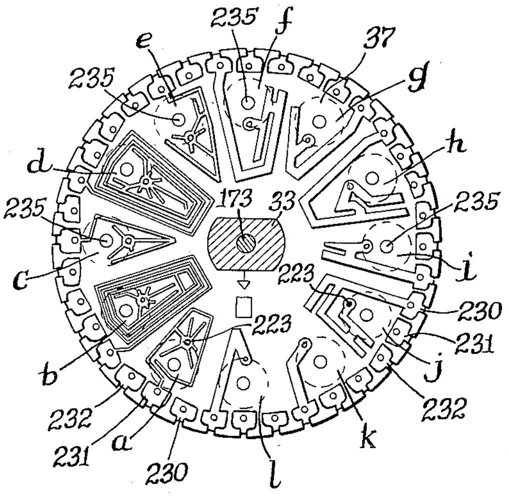

The disc 37 which provides the oscillator tuning elements is illustrated in Figs. 12 and 13. This disc is divided in the sectors *a* through *l* as the disc previously described. Each sector includes contacts 230, 231 and 232 which are arranged to engage fixed contacts 97, 98 and 99 respectively of the chassis. For operation on channel *a*, the circuit extends from the contact 230 on the side of the disc shown in Fig. 12 to the opening 233 and through to the other side and to the contact 231. There is no connection to the contact 232. Therefore, when a low band channel is selected, the circuit is completed between fixed contacts 97 and 98, and there is no connection between contacts 98 and 99 through the disc. For operation in a high band channel, such as channel *j*, a circuit is provided from contact 230 to the opening 233 on the side illustrated in Fig. 13, and through to the contact 232 on the opposite side shown in Fig. 12. This circuit from contacts 230 to 232 will be connected between contacts 97 and 99 on the chassis when the channel tuned by sector *j* is selected. It is therefore seen that by the use of three contacts, different portions of the oscillator circuit on the main chassis are utilized when operating in the high and low bands. This permits the use of separate coupling capacitors which may be selected to provide optimum temperature compensation on the two bands.

As illustrated in Fig. 2, conductive tuning screws 235 are provided for the inductors formed on the disc 37 of the oscillator section. These are similar to the tuning screws previously described and will change the effective inductance of the coil as the position of the head of the screw with respect to the coil is varied. A separate tuning screw is provided for each channel so that the oscillator section can be carefully adjusted for tuning the individual channels.

The use of conductors on both sides of the discs together with the use of three contacts in each sector permits very flexible changes in the circuit as the discs are moved from one position to another. In the antenna circuit, the portions printed on the two sides of the disc, together with the three connections thereto, provide for change in the series inductance as well as the coupling inductance. In the double tuned radio frequency amplifier, the two discs provide adjustment of the primary and secondary inductances for each channel, and permit the connection of one coupling circuit on the high band and another for the low band, with each coupling circuit being changed by series inductances for each channel. In the oscillator circuit the use of three separate connections permits change in the portion of the oscillator circuit utilized in the two bands as well as changing of the tuning inductance for each channel. This overall arrangement minimizes the tuning elements which must be provided for the individual channels, without requiring a large number of connections which would unduly complicate the structure.

As has been noted, it is possible to provide the effect of a fuse on the printed circuit by printing alternate paths, one of which is of narrow cross-section and the other of which is open. One such fuse is illustrated in Fig. 4 on the conducting strip 141 with the narrow portion being indicated at 160. This is illustrated in Fig. 15 with the portion 160 being burned out so that the circuit is broken. The connection may then be made through the gap 161 by providing a drop of solder 162 on the chassis to join the spaced portions. The strip 141 is in the filament circuit which leads to the sockets for tubes 24 and 25, and fuse protection is desirable to protect the printed leads and coil 146. A similar fuse is provided between the conducting strip 143 and the coil 146 shown in Fig. 5 and indicated at 163. In the event that the narrow connection is burned out, the connection may be completed by placing solder on the spaced portions indicated 164. This is in the filament circuit of tube 25, and also protecting printed conductors and coil 146. By providing the alternate path, the circuit can be repaired so that the entire chassis will not need to be replaced.

It is seen from the above that there has been provided a tuner in which many of the normally expensive circuit elements are provided by printed circuits so that such elements can be inexpensively provided with the required accuracy. Simple connecting means are provided so that the required switching is accomplished with a relatively few contacts to be changed. The entire structure is provided compactly with the overall construction being very simple and inexpensive.

Although a single embodiment of the invention has been described which is illustrative thereof, it is obvious that various changes and modifications can be made in the structure, within the intended scope of the invention as defined in the appended claims.

We claim:

1. In a television tuner for selectively tuning a television receiver to a plurality of signal channels, a disc of insulating material, a plurality of electrical inductance tuning elements deposited on both sides of said disc, said tuning elements on each side of said disc being formed in respective segments on each such side and respective ones of said tuning elements on opposite sides of said disc being interconnected through said disc, a series of electrical contacts deposited around the peripheral edge of said disc, with each of such contacts extending over said peripheral edge to engage both sides of said disc so as to be securely retained thereon, and with a selected number of said contacts being disposed within each of said segments, and electrical connections deposited on both sides of said disc between selected ones of said contacts in each of said segments and corresponding ones of said tuning elements therein.

2. In a television tuner for selectively tuning a television receiver to a plurality of signal channels, a disc of insulating material, a plurality of electrical inductance tuning elements deposited on both sides of said disc, said tuning elements on each side of said disc being formed in respective segments on each such side, said disc having a plurality of openings therein and the deposit forming said tuning elements extending through said openings to interconnect respective ones of said tuning elements on opposite sides of said disc and securely to hold said tuning elements on said disc, a series of electrical contacts deposited around the peripheral edge of said disc, with each of such contacts extending over said peripheral edge to engage both sides of said disc so as to be securely retained thereon, and with a selected number of said contacts being disposed within each of said segments, and electrical connections deposited on both sides of said disc between selected ones of said contacts in each of said segments and corresponding ones of said tuning elements therein.

3. In a television tuner for selectively tuning a television receiver to a plurality of signal channels, a disc of insulating material, a plurality of electrical inductance tuning elements deposited on both sides of said disc, said tuning elements on each side of said disc being formed in respective segments on each such side and respective ones of said tuning elements on opposite sides of said disc being interconnected through said disc, a series of notches formed around the peripheral edge of said disc, a corresponding series of electrical contacts deposited around said peripheral edge of said disc, with each of such contacts extending over said peripheral edge and through respective ones of said notches to engage both sides of said disc, and with the deposit forming said contacts extending through respective openings in said disc thereby to hold said contacts securely on said disc, a selected number of said contacts being disposed within each of said segments, and electrical connections deposited on both sides of said disc between selected ones of said contacts in each of said segments and corresponding ones of said tuning elements therein.

4. In a television tuner for selectively tuning a television receiver to a plurality of signal channels, a disc of insulating material, a plurality of electrical inductance elements deposited on both sides of said disc, said tuning elements on each side of said disc being formed in respective segments on each such side, said disc having a plurality of openings therein and the deposit forming said tuning elements extending through said openings to interconnect respective ones of said tuning elements on opposite sides of said disc and securely hold said tuning elements on said disc, a series of notches formed around the peripheral edge of said disc, a corresponding series of electrical contacts deposited around said peripheral edge of said disc, with each of such contacts extending over said peripheral edge and through respective ones of said notches to engage both sides of said disc, and with the deposit forming said contacts extending through respective openings in said disc thereby to hold said contacts securely on said disc, a selected number of said contacts being disposed within each of said segments, and electrical connections deposited on both sides of said disc between selected ones of said contacts in each of said segments and corresponding ones of said tuning elements therein.

5. In a television tuner for selectively tuning a television receiver to a plurality of signal channels, a disc of insulating material, a plurality of electrical inductance tuning elements deposited on both sides of said disc, said tuning elements on each side of said disc being formed in respective segments on each such side and respective ones of said tuning elements on opposite sides of said disc being interconnected through said disc, at least one of said inductive tuning elements including a plurality of electrical paths at least some of which being normally open and adapted to be selectively closed to change the value of said one of said tuning elements, a series of electrical contacts deposited around the peripheral edge of said disc, with each of such contacts extending over said peripheral edge to engage both sides of said disc so as to be securely retained thereon, and with a selected number of said contacts being disposed within each of said segments, and electrical connections deposited on both sides of said disc between selected ones of said contacts in each of said segments and corresponding ones of said tuning elements therein.

References Cited in the file of this patent

UNITED STATES PATENTS

| | | |
|---|---|---|
| 1,649,131 | Schwarz | Nov. 15, 1927 |
| 2,186,208 | Reid | Jan. 9, 1940 |
| 2,318,516 | Newbold | May 4, 1943 |
| 2,513,392 | Aust | July 4, 1950 |
| 2,543,560 | Thias | Feb. 27, 1951 |
| 2,643,361 | Mackey | June 23, 1953 |

OTHER REFERENCES

Printed Circuit Techniques, National Bureau of Standards circular 468, November 15, 1947.